United States Patent Office 2,862,794
Patented Dec. 2, 1958

2,862,794

PROCESS FOR THE MANUFACTURE OF HYDROGEN PEROXIDE

Charles Dufraisse, André Etienne, and Edmond Toromanoff, Paris, France, assignors to l'Etat Français Societe d'Electrochimie, d'Electrometallurgie et des Acieries Electriques d'Ugine, and l'Air Liquide, Societe Anonyme pour l'Etude de l'Exploitation des Procedes Georges Claude, both of Paris, France No Drawing. Application July 27, 1953
Serial No. 370,634

Claims priority, application France September 25, 1952

5 Claims. (Cl. 23—207)

It is known that some organic combinations capable of being easily hydrogenated and the hydrogenated form being capable of being easily oxidized, give hydrogen peroxide with simultaneous regeneration of the initial product which is recycled.

At first, for the organic combinations indicated below, it was contemplated to use azobenzene, azotoluene and other azoic derivatives, then the choice of the investigators settled on quinones and particularly on anthraquinones, the core of which resists relatively well the successive hydrogenations and oxidations of the functional groups.

The two reactions (hydrogenation and oxidation) are effected in solution in an organic solvent. Now hydroquinones, in general, have a lesser solubility than the quinones from which they are derived. The result is that for avoiding troublesome precipitations inside the apparatus, during preparation, it is necessary to take into account the solubility of hydroquinone, which amounts to saying that the operation is effected with a very dilute solution and the hourly output is low for a given volume of apparatus.

To obviate this, another solution consists in using a mixture of solvents, one of which is a good solvent for quinone and the other one for hydroquinone. The use of such mixtures also offers some drawbacks. Some mixtures containing benzene offer the drawback of being inflammable and all may change their compositions during operation due to the different volatilities of the components of the mixture. The result is a change in viscosity, which is very troublesome for a smooth production.

Now we have found, that phenazine and its derivatives, particularly alpha-alkylated derivatives offer, as compared to anthraquinones the advantage of giving dihydrogenated derivatives having the same solubility as the initial phenazine.

Thus, for instance, methyl-1-phenazine, as well as its dihydride are dissolved, at 25° C., in a proportion of 10% in the following solvents: n-heptyl acetate, amyl acetate, methyl heptanoate.

The 10% solubility allows the preparation of hydrogen peroxide with an excellent yield, in any one of these solvents through the medium of methyl-1-phenazine.

Of course, other solvents can be used such as butyl heptanoate and heptyl heptanoate.

The solubility of the two forms of methyl-1-phenazine in any one of these solvents is 9%.

Another interesting phenazinic derivative is the methyl ester of phenazine-1-carboxylic acid.

Its solubility, as well as that of the dihydride, is of the order of 7.5% in any one of the following solvents: amyl acetate, heptyl acetate, methyl heptanoate, butyl heptanoate, heptyl heptanoate.

In cold conditions of use, no phenazine N-oxides are formed.

Example 1.—Phenazine (1 g.) in an alcoholic solution, is hydrogenated by pouring it into an alkaline solution of sodium hydrosulphite at 60–70° C. The dihydrophenazine obtained is filtered, washed, sublimated. A yield of 80% is obtained.

0.8 g. of dihydrophenazine are placed in suspension in 100 cu. cm. of amyl acetate, then oxidised by air, while stirring for 45 minutes. The hydrogen peroxide formed is extracted by 4 washings with distilled water. There is thus obtained 0.135 g. of hydrogen peroxide, which corresponds to a yield of 90% referred to dihydrophenazine.

Phenazine, in solution in amyl acetate, may be recovered for a new hydrogenation.

Example 2.—1 g. of phenazine is dissolved in 100 cu. cm. of amyl acetate. Hydrogenation is effected, in the presence of Raney nickel until the transformation is complete.

The dihydrophenazine solution is then oxidised with air, by stirring on a shaking machine for 45 minutes, then the hydrogen peroxide formed is extracted by washing with distilled water. 0.175 g. are thus obtained, which corresponds to a yield of 94% referred to dihydrophenazine.

The solution of phenazine in amyl acetate is then ready for use in a new cycle.

Example 3.—1 g. of methyl-1-phenazine is hydrogenated in 10 cu. cm. of heptyl acetate in the presence of Raney nickel, until its complete transformation into methyl-1-dihydrophenazine. Air is passed through the hydrogenated solution for 10 to 15 minutes. The hydrogen peroxide formed is extracted by several washings with distilled water. The yield in hydrogen peroxide is higher than 90%.

What we claim is:

1. A process for the manufacture of hydrogen peroxide comprising hydrogenating, then oxidizing an organic substance in a suitable solvent to form hydrogen peroxide, then extracting the hydrogen peroxide formed by washing with distilled water and recovering the organic substance, in which the organic substance is selected from the group consisting of phenazine, its alkyl derivatives and its carboxylic derivatives.

2. A process for the manufacture of hydrogen peroxide comprising hydrogenating, then subjecting to oxidation an organic substance in a suitable solvent to form hydrogen peroxide, then extracting the hydrogen peroxide formed by washing with distilled water and recovering the organic substance, in which the organic substance is an alpha-alkylated compound of phenazine.

3. A process for the manufacture of hydrogen peroxide comprising hydrogenating, then subjecting to oxidation an organic substance in a suitable solvent to form hydrogen peroxide, then extracting the hydrogen peroxide formed by washing with distilled water and recovering the organic substance, in which the organic substance is 1-methyl-phenazine.

4. A process according to claim 1, in which the solvent is selected from the group constituted by n.-heptyl acetate, amyl acetate and methyl heptanoate.

5. A process according to claim 1, which comprises further reusing the recovered organic substance.

References Cited in the file of this patent

UNITED STATES PATENTS

| | | |
|---|---|---|
| 2,059,569 | Kenmore | Nov. 3, 1936 |
| 2,455,238 | Dawsey et al. | Nov. 30, 1948 |

FOREIGN PATENTS

| | | |
|---|---|---|
| 465,070 | Great Britain | Apr. 30, 1937 |
| 489,979 | Great Britain | Aug. 8, 1938 |

OTHER REFERENCES

"Organic Chemistry," by Paul Karrer, second English ed., 1946; pages 600–602. Elsevier Book Co., Inc.

Atherton et al.: "Journal of the Society of Dyers and Colorists," vol. 62, pages 108–114, April 1946.

Karrer: "Organic Chemistry," 2nd edition, 1946, pages 584–585.

Thorpe et al.: "Thorpe's Dictionary of Applied Chemistry," 1937, vol. I, pages 562–579.

Weissberger: "The Technique of Organic Chemistry," 1950, vol. III, pages 295–297.